United States Patent
Park et al.

(10) Patent No.: US 8,629,851 B1
(45) Date of Patent: *Jan. 14, 2014

(54) FINGER GESTURE RECOGNITION FOR TOUCH SENSING SURFACE

(75) Inventors: Tony Park, Lynnwood, WA (US); Luther Lu, Shanghai (CN); Nelson Chow, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,179

(22) Filed: Apr. 17, 2012

Related U.S. Application Data

(63) Continuation of application No. 12/337,411, filed on Dec. 17, 2008, now Pat. No. 8,184,102.

(51) Int. Cl.
*G06F 3/041* (2006.01)
(52) U.S. Cl.
USPC ........................................ 345/173; 178/18.01
(58) Field of Classification Search
USPC .................... 345/173–181; 178/18.01–18.06, 178/19.01–19.03
See application file for complete search history.

(56) References Cited

U.S. PATENT DOCUMENTS

2008/0316183 A1  12/2008  Westerman et al.
2009/0284478 A1  11/2009  De la Torre Baltierra et al.

OTHER PUBLICATIONS

U.S. Appl. No. 12/337,411, Finger Gesture Recognition For Touch Sensing Surface, filed Dec. 17, 2008; 40 pages.
USPTO Non Final Rejection for U.S. Appl. No. 12/337,411 dated Nov. 23, 2011; 12 pages.
USPTO Notice of Allowance for U.S. Appl. No. 12/337,411 dated Mar. 22, 2012; 9 pages.

*Primary Examiner* — William Boddie
*Assistant Examiner* — Saifeldin Elnafia

(57) ABSTRACT

Touch sensor methods, devices and systems are disclosed. One embodiment of the present invention pertains to a method comprising monitoring a finger movement along a touch sensing surface based on position data of a finger touching the touch sensing surface, where the position data is obtained by locating a position of a force applied by the finger in a coordinate of the touch sensing surface. In addition, the method comprises generating direction data associated with the finger movement if the finger movement travels for more than a threshold distance. Furthermore, the method comprises determining a finger gesture which corresponds to the finger movement using a lookup table having multiple preconfigured finger gestures based on the direction data.

18 Claims, 8 Drawing Sheets

| PRIMARY DIRECTION 252 | DIRECTION NUMBER 254 |
|---|---|
| N | 0 |
| NE | 1 |
| E | 2 |
| SE | 3 |
| S | 4 |
| SW | 5 |
| W | 6 |
| NW | 7 |

```
if(DOC==1)Gesture=DOB[0]+1;
else if(DOC==2)
{
    if((DOB[0]==5)&&(DOB[1]==3))Gesture=9;
    if((DOB[0]==3)&&(DOB[1]==5))Gesture=10;
    if((DOB[0]==1)&&(DOB[1]==3))Gesture=11;
    if((DOB[0]==3)&&(DOB[1]==1))Gesture=12;
}
else if(DOC==3)
{
    if((DOB[0]==2)&&(DOB[1]==5)&&(DOB[2]==2))Gesture=13;
    if((DOB[0]==5)&&(DOB[1]==2)&&(DOB[2]==7))Gesture=14;
}
else if(DOC==4)
{
    if((DOB[0]==4)&&(DOB[1]==2)&&(DOB[2]==0)&&(DOB[3]==6))Gesture=15;
}
if(((DC[0]>0)&&(DC[1]>0)&&(DC[2]>0)&&(DC[3]>0)&&(DC[4]>0)&&(DC[5]>0)&&(DC[6]>0)&&(DC[7]>0))Gesture=16;
```

ALGORITHM 402

LOOKUP TABLE 404

FIGURE 4

FINGER GESTURE RECOGNITION FOR TOUCH SENSING SURFACE

RELATED APPLICATIONS

This application is a continuation application of U.S. application Ser. No. 12/337,411 filed Dec. 17, 2008, which is incorporated herein by reference.

FIELD OF TECHNOLOGY

Embodiments of the present invention relate to the field of electronics. More particularly, embodiments of the present invention relate to a touch sensing device, system and method.

BACKGROUND

A touch screen or touch panel is a display which can detect a location of a touch on the surface of a display screen. The touch may be applied using one or more fingers or an object, such as a stylus. One of the available features of the touch screen is recognition of a finger gesture. The finger gesture may be processed by the device to perform a function, e.g., panning, resizing, zooming, rotating, etc. Such a finger gesture may be recognized by using a touch screen divided into a small number of large regions. The finger gesture is then identified by tracking a presence of the finger in each of the regions over time.

However, for mobile applications with an already scaled-down touch screen or panel, a small or slight finger movement may not be easily recognized because its screen may not be easily divided into small isolated regions. Furthermore, response time for recognizing the finger gesture may be delayed due to time consuming processes to indiscriminately track and calculate the finger gesture in real time.

SUMMARY

One embodiment of the present invention pertains to a method for recognizing a finger gesture on a touch sensing surface. The method comprises monitoring a finger movement on a touch sensing surface based on position data of a finger touching the touch sensing surface, where the position data is obtained by locating a position of a contact made by the finger in a coordinate of the touch sensing surface. In addition, the method comprises generating direction data associated with the finger movement if the finger movement travels for more than a threshold distance. Furthermore, the method comprises determining a finger gesture which corresponds to the finger movement using a lookup table having multiple preconfigured finger gestures based on the direction data.

Another embodiment of the present invention pertains to a touch sensing device which comprises a touch sensing surface for continuously sensing a finger movement along the touch sensing surface. The touch sensing device further comprises a processor coupled to the touch sensing surface for calculating respective position data associated with the finger movement in response to the continuous sensing of the finger movement. In addition, the processor is operable for determining a finger gesture which corresponds to the finger movement by calculating direction data associated with the finger movement and by retrieving the finger gesture from a lookup table having multiple preconfigured finger gestures based on the direction data.

BRIEF DESCRIPTION OF THE DRAWINGS

Example embodiments are illustrated by way of example and not limitation in the figures of the accompanying drawings, in which like references indicate similar elements and in which:

FIG. 4 illustrates an exemplary procedure used for matching a finger movement with one of preconfigured finger gestures and a lookup table comprising the preconfigured finger gestures, according to one embodiment of the present invention.

Other features of the present embodiments will be apparent from the accompanying drawings and from the detailed description that follows.

DETAILED DESCRIPTION

A method, device and/or system are disclosed that may recognize a small or slight finger gesture at a faster response time. In this invention, a finger gesture can be identified by processing position data of a finger movement in real time, by discriminately generating direction data for a meaningful finger movement based on the position data, and by selecting a gesture which corresponds to the finger movement using a lookup table. Accordingly, the small or slight finger gesture can be recognized by setting the meaningful finger movement with a small number. Additionally, the response time for processing or recognizing the finger gesture can be reduced based on the discriminate generation of the direction data, which significantly reduces a runtime computation, as well as the use of the lookup table, which replaces the runtime computation with a simpler array indexing operation. Thus, embodiments include a faster and more precise touch sensing device and/or method.

As illustrated in the detailed description, other embodiments also pertain to methods, devices and systems that reduce the response time used to process a finger gesture on the touch sensing device and that realizes more accurate sensing of the finger gesture. Through utilizing a finger gesture recognition technique which continually monitors the finger movement but intermittently generates direction data used to identify the finger gesture, the embodiments provide a faster and more precise touch sensing device, system and/or method.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the disclosure is intended to cover alternatives, modifications and equivalents, which may be included within the spirit and scope of the invention. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present invention.

Figure 1A:
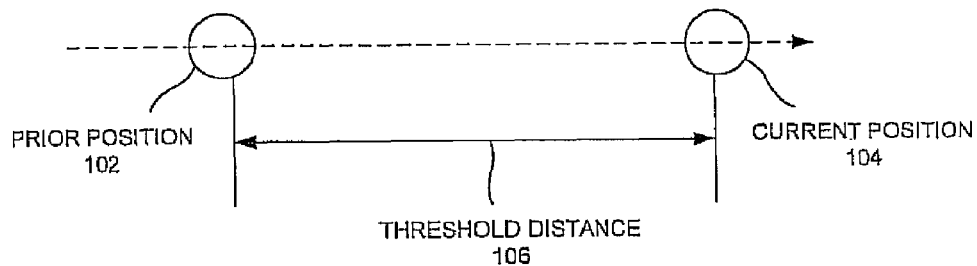
FIG. 1A illustrates an exemplary process of a finger movement on a touch sensing surface, according to one embodiment of the present invention.

FIG. 1A illustrates an exemplary process of tracking a finger movement along a touch sensing surface, according to one embodiment of the present invention. In FIG. 1A, a prior position 102 may be an initial position of the finger movement. A current position 104 may indicate a current location of a finger touching the touch sensing surface. It is appreciated that the finger movement may start from the moment the finger is laid on the touch sensing surface to the moment the finger is taken off from the touch sensing surface.

In one embodiment, direction data of the finger movement, which indicates the direction of the finger movement, may be generated if the current position 104 travels from the prior position 102 (e.g., a linear finger movement) for more than a threshold distance 106. Accordingly, the calculation to generate the direction data may be performed intermittently rather than continuously. As a result, the response time for identifying a finger gesture which corresponds to the finger movement or the path of the finger movement may be reduced. Furthermore, once the current position 104 passes the threshold distance 106 from the prior position 102, the prior position 102 is updated with the value of the current position 104, and the monitoring or tacking of the finger movement continues. Although it is not shown, the finger movement may comprise one or more linear finger movements forming a finger gesture, e.g., a line, an angle, a triangle, a rectangle, etc.

Figure 1B:
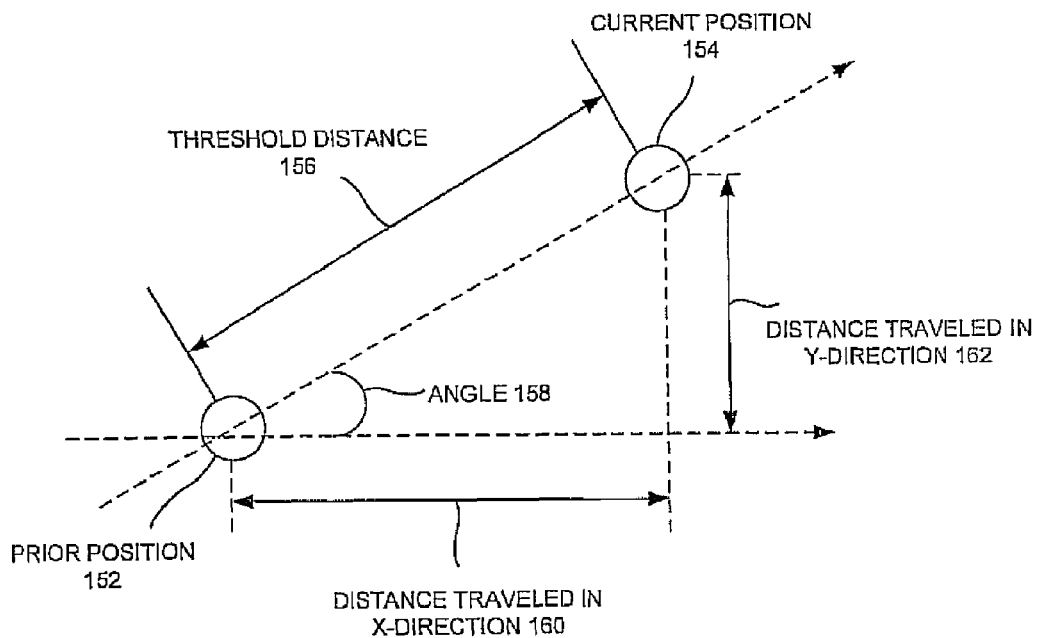
FIG. 1B illustrates an exemplary process of identifying direction data associated with a finger movement, according to one embodiment of the present invention.

FIG. 1B illustrates an exemplary process of identifying direction data associated with a finger movement, according to one embodiment of the present invention. In FIG. 1B, an angle 158 of the finger movement from a prior position 152 to a current position 154 is forty-five degrees to the left from the eastward direction of the x-axis. Accordingly, when the current position 154 travels from the prior position 152 for more than a threshold distance 156, direction data based on the angle 158 of the finger movement (e.g., a linear finger movement from the prior position 152 to the current position 154) with respect to the x-axis may be calculated and/or generated. It is appreciated that the angle 158 may be obtained based on a distance traveled in the x-direction 160 and a distance traveled in the y-direction 162 by the finger (e.g., angle=arctan (the distance traveled in the y-direction 162/the distance traveled in the x-direction 160)). For example, the direction data of the linear finger movement illustrated in FIG. 1A is zero with respect to the eastward direction of the x-axis.

Figures 2A, 2B:
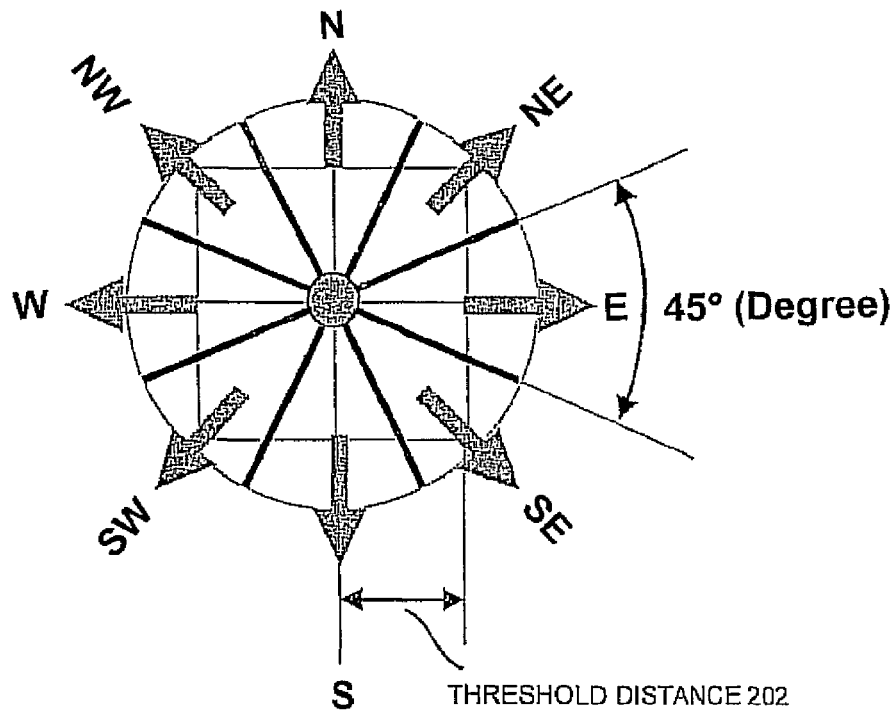
FIG. 2A illustrates exemplary primary directions used to identify direction data, according to one embodiment of the present invention.
FIG. 2B is an exemplary table of the primary directions of FIG. 2A matched with their respective direction numbers, according to one embodiment of the present invention.

FIG. 2A illustrates exemplary primary directions used to identify direction data, according to one embodiment of the present invention. In one embodiment, the angle 158 of the finger movement in FIG. 1B may be identified by one of the eight primary directions. For example, the north direction (N) may be a finger movement (e.g., a linear finger movement) with the angle ranging from −22.5 degrees to 22.5 degrees with respect to the northward direction of the y-axis. The northeast direction (NE) may be a finger movement (e.g., a linear finger movement) having the angle ranging from 22.5 degrees to 67.5 degrees with respect to the northward direction of the y-axis.

The northeast direction (NE), the east direction (E), the southeast direction (SE), the south direction (S), the southwest direction (SW), the west direction (W) and the northwest (NW) direction may be defined in a similar manner. It is appreciated that the primary directions can comprise more or less than the eight primary directions.

FIG. 2B is an exemplary table of the primary directions 252 of FIG. 2A matched with their respective direction numbers 254, according to one embodiment of the present invention. As illustrated in FIG. 2B, the direction numbers 254 assigned to the primary directions 252 comprise integers ranging from 0 to 7.

Figure 3A:
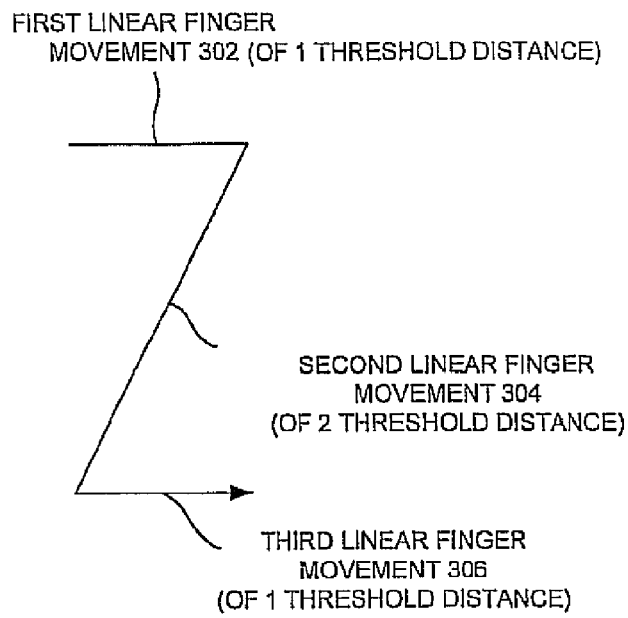
FIG. 3A illustrates an exemplary finger movement, according to one embodiment of the present invention.

FIG. 3A illustrates an exemplary finger movement, according to one embodiment of the present invention. In one embodiment, the finger movement may comprise multiple linear finger movements. In FIG. 3A, the finger movement comprises three linear finger movements which include a first linear finger movement 302, a second linear finger movement 304 and a third linear finger movement 306, provided that each of the three linear finger movements travels for more than the threshold distance. In FIG. 3A, the first linear finger movement 302 travels for more than the threshold distance toward the east (E) direction, the second linear finger movement 304 travels for more than twice the threshold distance toward the southwest (SW) direction and the third linear finger movement 306 travels for more than the threshold distance toward the east (E) direction.

Figure 3B:
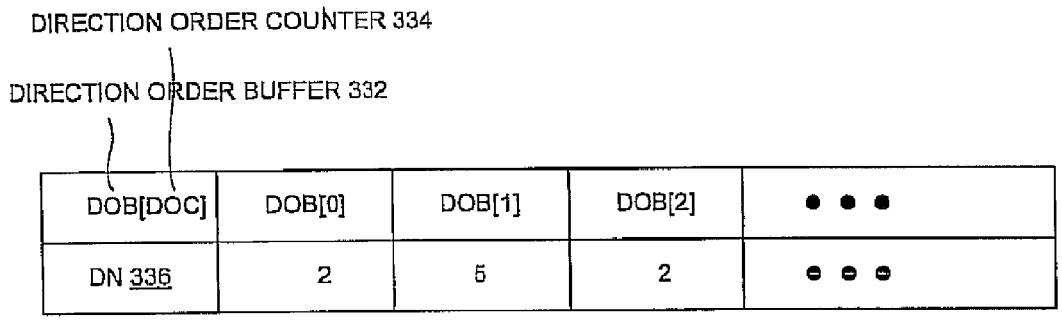
FIG. 3B illustrates exemplary direction data, according to one embodiment of the present invention.

FIG. 3B illustrates exemplary direction data, according to one embodiment of the present invention. In one embodiment, the direction data, which may be obtained based on the discriminate or intermittent processing of position data associated with a finger movement, may be stored using an array. As illustrated in FIG. 3B, the direction data comprises a direction order buffer 332 which stores the direction of each linear finger movement. A direction order counter (DOC) 334, which is the index of the direction order buffer 334, may indicate the number of direction change(s) associated with the finger movement.

For example, in FIG. 3B, the array is based on the finger movement of FIG. 3A. As the finger performs the first finger movement 302, "2" which indicates the east (E) direction is stored as a direction number (DN) 336 of the direction order buffer [0]. In addition, as the finger performs the second finger movement 302, "5" which indicates the southwest (SW) direction is stored as the direction number 336 of the direction order buffer [1]. It is appreciated that the index "1" indicates that there has been one directional change (e.g., from the east (E) direction to the southwest (SW) direction). Furthermore, as the finger performs the third finger movement 306, "2" which indicates the east (E) direction is stored as the direction number 336 of the direction order buffer [2].

Thus, based on the finger movement or path of the finger movement described in FIG. 3A, the array of three elements is generated and/or stored.

Figure 3C:
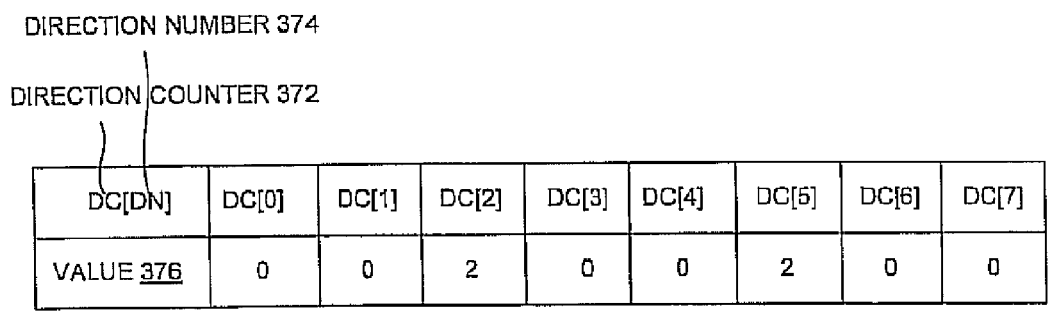
FIG. 3C illustrates another exemplary direction data, according to one embodiment of the present invention.

FIG. 3C illustrates another exemplary direction data, according to one embodiment of the present invention. In one embodiment, the direction data may comprise a direction counter 372. The direction counter 372 may be used to indicate the number of linear finger movements made for each primary direction, where each liner finger movement travels for more than the threshold distance. A direction number 374 indicate one of the eight primary directions illustrated in FIGS. 2A and 2B.

Thus, as illustrated in FIG. 3C, "2" is stored as the value for DC[2], which indicates that the finger movement includes one or more linear finger movements towards the east (E) direction by twice the threshold distance. Additionally, "2" is stored as the value for DC[5], which indicates that the finger movement includes one or more linear finger movements towards the southwest (SW) direction by twice the threshold distance. In one embodiment, the array illustrated in FIG. 3C may be useful to characterize a finger gesture or finger movement which takes after a circle, as will be illustrated in more details in FIG. 4. For example, if all the values 376 of the array for the direction counter 372 are a none zero number (e.g., 1), one can conclude that the finger gesture is for a circle.

In one embodiment, a false direction can be eliminated based on the direction number 374 in the direction counter 372. For example, if same direction continues less than a user defined number, the direction can be identified as an invalid direction (e.g., noise). The user defined number can be set based on the quality of the touch sensing surface.

FIG. 4 illustrates an exemplary procedure 402 used for matching a finger movement with one of preconfigured finger gestures and a lookup table 404 comprising the preconfigured finger gestures, according to one embodiment of the present invention. In the procedure 402, the direction data of the finger movement which may be based on one or more linear finger movements (e.g., direction order buffer) are matched with preconfigured finger gestures of the lookup table 404.

In one embodiment, if there is no directional change or there is one linear finger movement, then the finger movement is identified as a finger gesture of a straight line in one of the eight primary directions. Accordingly, one of preconfigured gestures 1 through 8 of the lookup table 404 may be accessed and/or retrieved as the finger gesture which corresponds to the finger movement.

In one embodiment, if there is one directional change or there are two linear finger movements, then the finger movement is identified as a finger gesture of an angle. Accordingly, one of preconfigured gestures 9 through 12 of the lookup table 404 may be accessed and/or retrieved as the finger gesture which corresponds to the finger movement.

In one embodiment, if there are two directional changes or there are three linear finger movements, then the finger movement is identified as a finger gesture of a triangle. Accordingly, one of preconfigured gestures 13 and 14 of the lookup table 404 may be accessed and/or retrieved as the finger gesture which corresponds to the finger movement.

In one embodiment, if there are three directional changes or there are four linear finger movements, then the finger movement is identified as a finger gesture of a rectangle. Accordingly, preconfigured gesture 15 of the lookup table 404 may be accessed and/or retrieved as the finger gesture which corresponds to the finger movement.

In one embodiment, as described in FIG. 3C, if all the values of the array for the direction counter (DC) are a none-zero number, one can conclude that the finger gesture is a circle, provided that the finger gesture is not one of the other preconfigured gestures provided in the lookup table 404 and that the finger gesture comprises finger gestures 1 through 8 of the lookup table 404 in order. Accordingly, preconfigured gesture 16 of the lookup table 404 may be retrieved as the finger gesture which corresponds to the finger movement. Although FIG. 4 describes the procedure 402 and the lookup table 404, respectively, based on sixteen recognizable finger gestures, it is appreciated that a greater or less number of finger gestures may be identified in a similar manner using a similar procedure and/or lookup table. It is also appreciated that the usage of the lookup table 404 may reduce time to identify a single or multiple finger gestures using other objects (e.g., a stylus).

Figure 5:
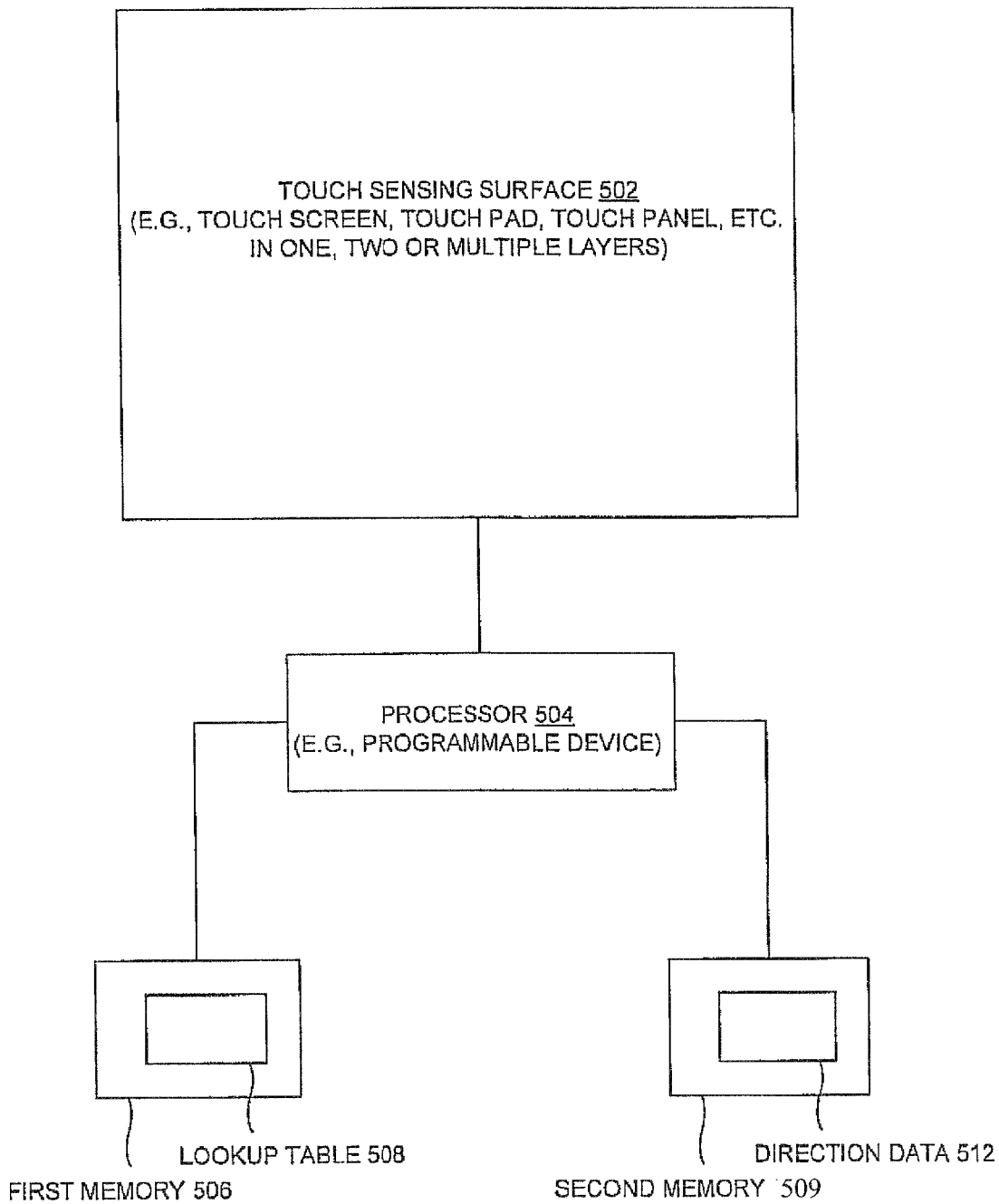
FIG. 5 illustrates an exemplary device for identifying a finger gesture, according to one embodiment of the present invention.

FIG. 5 illustrates an exemplary device for identifying a finger gesture, according to one embodiment of the present invention. In FIG. 5, the device comprises a touch sensing surface 502 for continuously sensing a finger movement applied along the touch sensing surface 502. In one embodiment, the touch sensing surface 502 comprises a touch screen, touch pad, track pad, touch panel, etc.

In one embodiment, the touch sensing surface 502 may be based on a one layer solution, a two layer solution or a multiple layer solution. For example, in the single layer solution called a surface capacitance screen, a continuous sheet of conductive material (e.g., Indium tin oxide (ITO)) is deposited on glass or film. The sheet is used as a resistor. There are also electrodes at the four corners of the screen. Thus, when a user touches one spot of the screen, the screen acts as a two dimensional resistive divider. When electrical charges are accumulated in or removed from a capacitor formed between the spot and the user's finger, the current will flow to each electrode proportional to the distance of the user's finger from the electrode of the panel for measurement. With the two layer solution, rows and columns of conductive cells are interconnected. Thus, when a user touches the screen, a capacitor bridging a row and a column affected by the touch is formed for measurement.

It is appreciated that the one layer, two layer and multiple layer solutions are well known to people skilled in the art. It is also appreciated that the touch sensing surface 502 may be based on one of numerous touch sensing technologies, which include but not limited to a resistive, surface acoustic wave, projected capacitance, strain gauge, optical imaging, dispersive signal technology and acoustic pulse recognition technology as well as the capacitive touch sensing technology described above.

In one embodiment, the device also comprises a processor 504 (e.g., a programmable device), which is coupled to the touch sensing surface 502, for calculating respective position data associated with the finger movement in response to the continuous sensing of the finger movement. It is appreciated that the position data may be obtained by locating a position of a force applied by the finger in the touch sensing surface 502.

Additionally, the processor 504 is operable for determining a finger gesture which corresponds to the finger movement by calculating direction data 512 associated with the finger movement and by retrieving the finger gesture from a lookup table 508 having multiple preconfigured finger gestures based on the direction data. Furthermore, as illustrated in FIG. 5, the device comprises a first memory 506, which stores the lookup table 508, and a second memory 509, which stores the direction data 512.

Figure 6A:
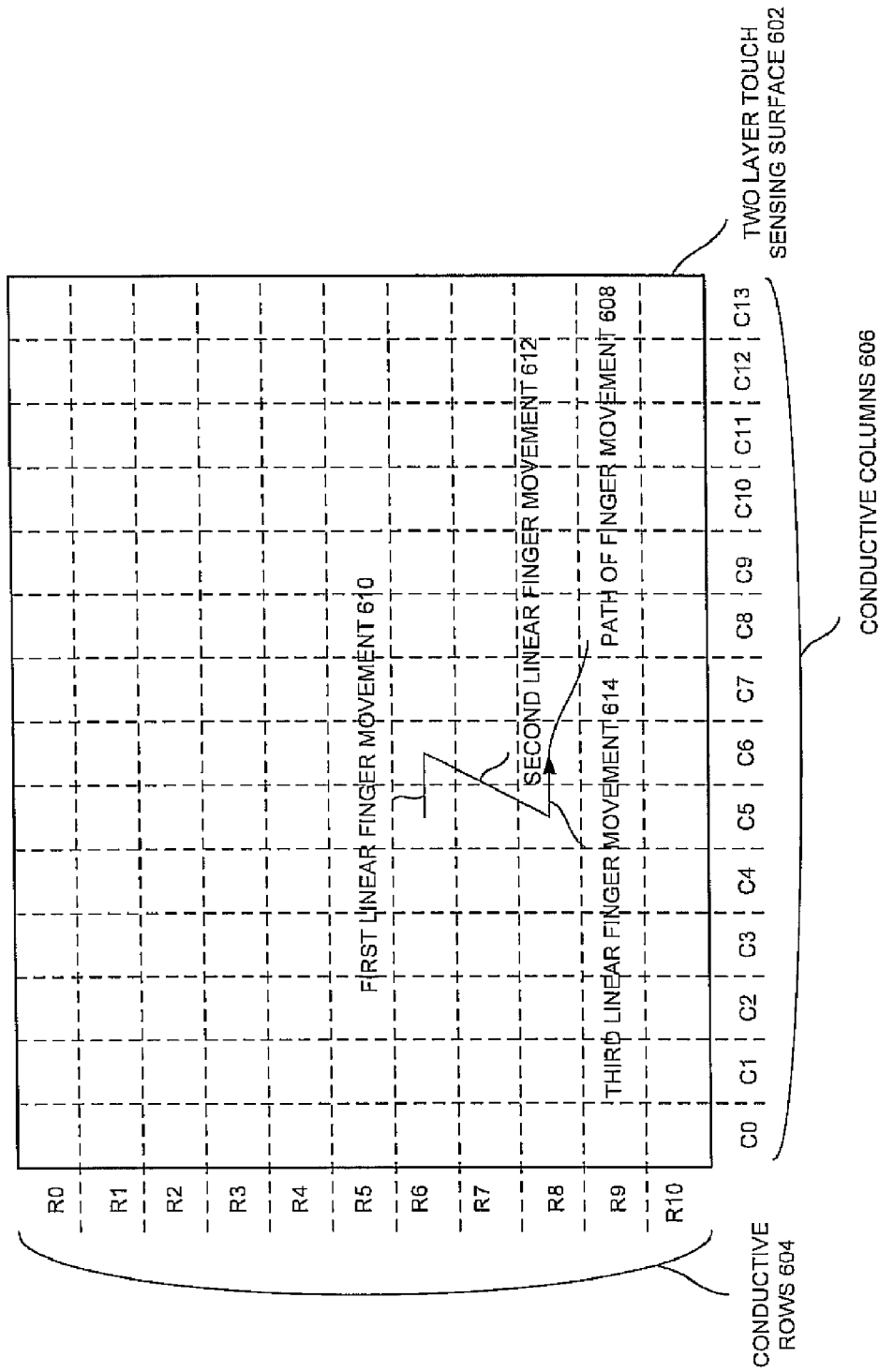
FIG. 6A illustrates an exemplary process for identifying a finger gesture on a two layer touch sensing surface, according to one embodiment of the present invention.

FIG. 6A illustrates an exemplary process for identifying a finger gesture on a two layer touch sensing surface 602, according to one embodiment of the present invention. As illustrated in FIG. 6A, the two layer touch sensing surface 602 is formed using multiple conductive rows 604 (e.g., R0 through R10) and multiple conductive columns 606 (e.g., C0 through C13). Although the example illustrates a limited number of columns or rows, it is appreciated more number of the conductive rows 604 and columns 606 can be formed on the two layer touch sensing surface 602.

For the two layer touch sensing surface 602, a capacitance may be sensed bridging a row and a column of the two layer touch sensing surface 602 when a user applies a touch to a spot which crosses the row and column. Thus, position data of the touch may be obtained by scanning the rows and columns and by processing the capacitance formed between the row and column. In FIG. 6A, a path of finger movement 608 comprises three linear finger movements which includes a first linear finger movement 610, a second linear finger movement 612 and a third linear finger movement 614.

The first linear finger movement 610 starts at (R6, C5) and terminates at (R6, C6). The second linear finger movement 612 starts at (R6, C6) and terminates at (R8, C5). The third linear finger movement 614 starts at (R8, C5) and terminates at (R8, C6). Based on the coordinates, it can be determined whether each of the three linear finger movements travels for more than a threshold distance. Additionally, the direction data of each linear finger movement can be obtained by calculating the angle between the current position and the prior position of each linear finger movement.

In one embodiment, the first linear finger movement 610, the second linear finger movement 612 or the third linear finger movement 614 may be recognized or identified as a noise if one travels less than the threshold distance. The threshold distance may be set in terms of pixel (e.g., 10 pixels). Alternatively, the threshold distance may be set in terms of the number of the conductive rows 604 and/or conductive columns 606.

Figure 6B:
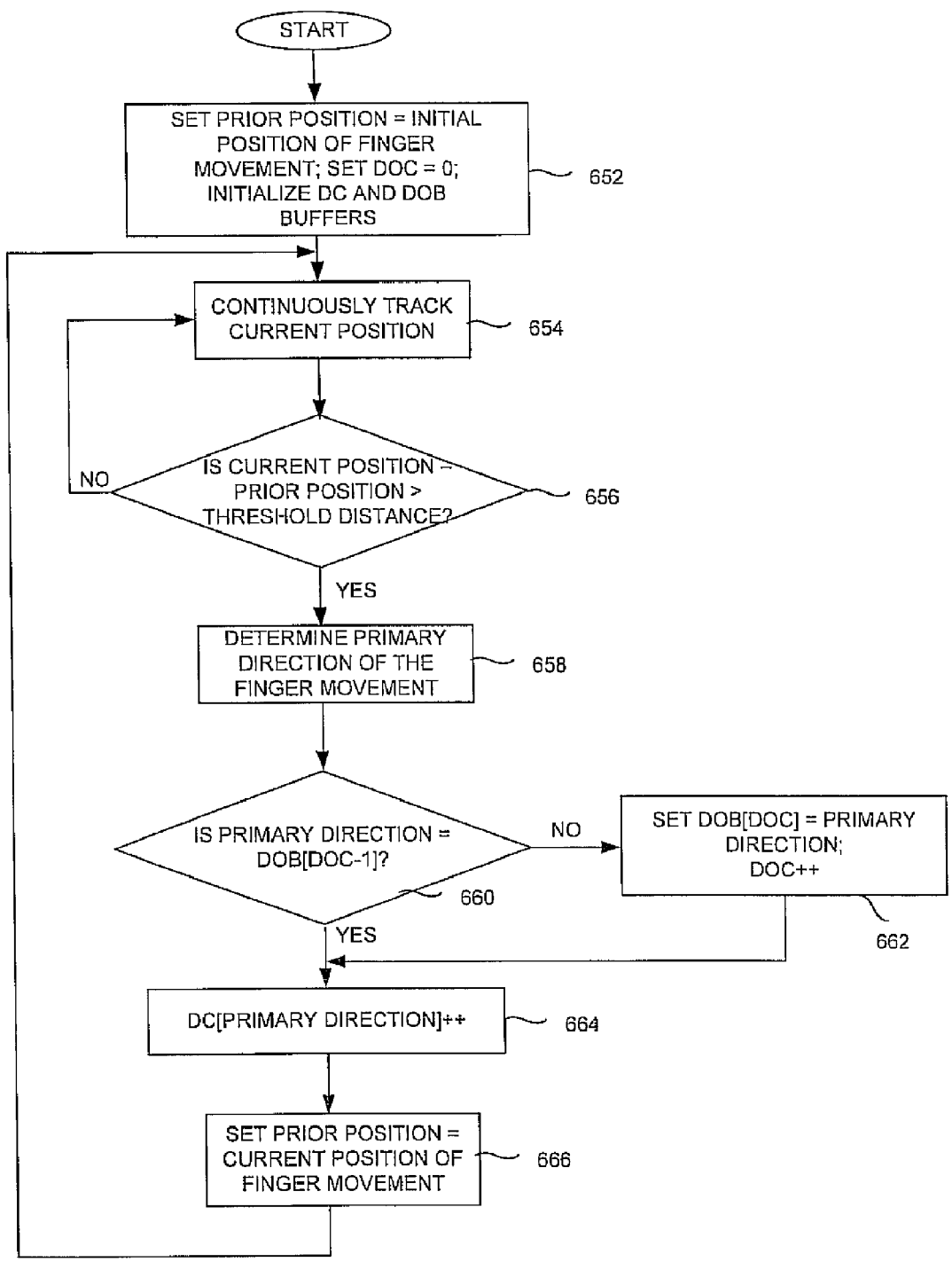
FIG. 6B illustrates a flow chart of an exemplary process for identifying the finger gesture in FIG. 6A, according to one embodiment of the present invention.

FIG. 6B illustrates a flow chart of an exemplary process for identifying the finger gesture in FIG. 6A, according to one embodiment of the present invention. In operation 652, a prior position is set with an initial position of a finger movement. For example, in FIG. 6A, the prior position is set as (R6, C5). In addition, a direction order counter is set as "0". Furthermore, direction counters for the primary directions (e.g., eight primary directions) and direction order buffers are initialized.

In operation 654, as a finger is moving along the two layer touch sensing surface 602, thus creating a path of the first linear finger movement 610, the current position is continuously tracked. While the current position is being tracked, it is compared with the prior position to see if the distance between the current position and the prior position is greater than the threshold distance. If the difference between the current position and the prior position is less than the threshold distance in operation 656, then the tracking of the first linear finger movement 610 is continued.

If the difference between the current position and the prior position is greater than the threshold distance in operation 656, then the primary direction of the finger movement (e.g., the first linear finger movement 610) is determined in operation 658. As illustrated in FIG. 6A, the primary direction of the first linear finger movement 610 is determined as the east (E) direction with the direction number "2." Then, since the primary direction is not equal to the previous direction order buffer (e.g., DOB[−1] or null value) in operation 660, which indicates that the primary direction is the first linear finger movement 610, the primary direction or (e.g., E) or its direction number "2" is stored as the direction number of the current direction order buffer (e.g., DOB[0]) in operation 662. Additionally, the direction order counter is increased by 1.

Then, the value of DC[primary direction] (e.g., DC[2]) is increased by one in operation 664, which indicates that the path of the finger movement includes a linear finger movement in the east direction by the threshold distance. Then, in operation 666, the current position of the finger movement (e.g., at the beginning of the second linear movement 612) is set as the prior position.

Then, the current position is continuously tracked in operation 654. Then, if the current position is greater than the prior position by more than the threshold distance in operation 656, which is expected to happen in the middle of the second linear finger movement 612 as illustrated in FIG. 3A, the primary direction of the first half of the second linear finger movement 612 is determined in operation 658. In the example, the primary direction is determined as the southwest (SW) direction with the direction number of "5." Then, since the primary direction is not equal to the direction number of the previous direction order buffer (e.g., DOB[0]) in operation 660, which indicates a change in direction, the primary direction, SW, or its equivalent direction number is stored in the current direction order buffer (e.g., DOB[1]) in operation 662. In addition, the direction order counter is increased to "1."

Then, in operation 664, the value of DC [primary direction] (e.g., DC[5]) is increased by one in operation 664, which indicates that the path of the finger movements includes a linear finger movement in the southwest direction by the threshold distance. Then, in operation 666, the current position of the finger movement (e.g., in the middle of the second linear movement 612) is set as the prior position.

Then again, the current position is continuously tracked in operation 654. Then, if the current position is greater than the prior position by more than the threshold distance in operation 656, which is expected to happen at the end of the second linear finger movement 612 as illustrated in FIG. 3A, the primary direction of the second half of the second linear finger movement 612 is determined in operation 658. In the example, the primary direction is determined as the southwest (SW) direction with the direction number of "5." Then, since the primary direction is equal to the direction number of the previous direction order buffer (e.g., DOB[1]), which indicates no change in direction, the value of DC [primary direction] (e.g., DC[5]) is increased by one (e.g., to two) in operation 664. Then, in operation 666, the current position of the finger movement (e.g., at the end of the second linear movement 612) is set as the prior position.

Lastly, the current position is continuously tracked in operation 654. Then, if the current position is greater than the prior position by more than the threshold distance in operation 656, which is expected to happen at the end of the third linear finger movement 614, the primary direction of the third linear finger movement 614 is determined in operation 658. In the example, the primary direction is determined as the east (E) direction with the direction number of "2." Then, since the primary direction is not equal to the direction number of the previous direction order buffer (e.g., DOB[1]) in operation 660, which indicates a change in direction, the primary direction, E, is stored as the current direction order buffer (e.g., DOB[2]) in operation 662. In addition, the direction order counter is increased to "2."

Then, the value of DC [primary direction] (e.g., DC[2]) is increased by one (e.g., to two) in operation 664. With the termination of the finger movement, the stored direction data may be used to select a finger gesture (e.g., finger gesture 13) using the lookup table 404 as illustrated in FIG. 4.

Figure 7:
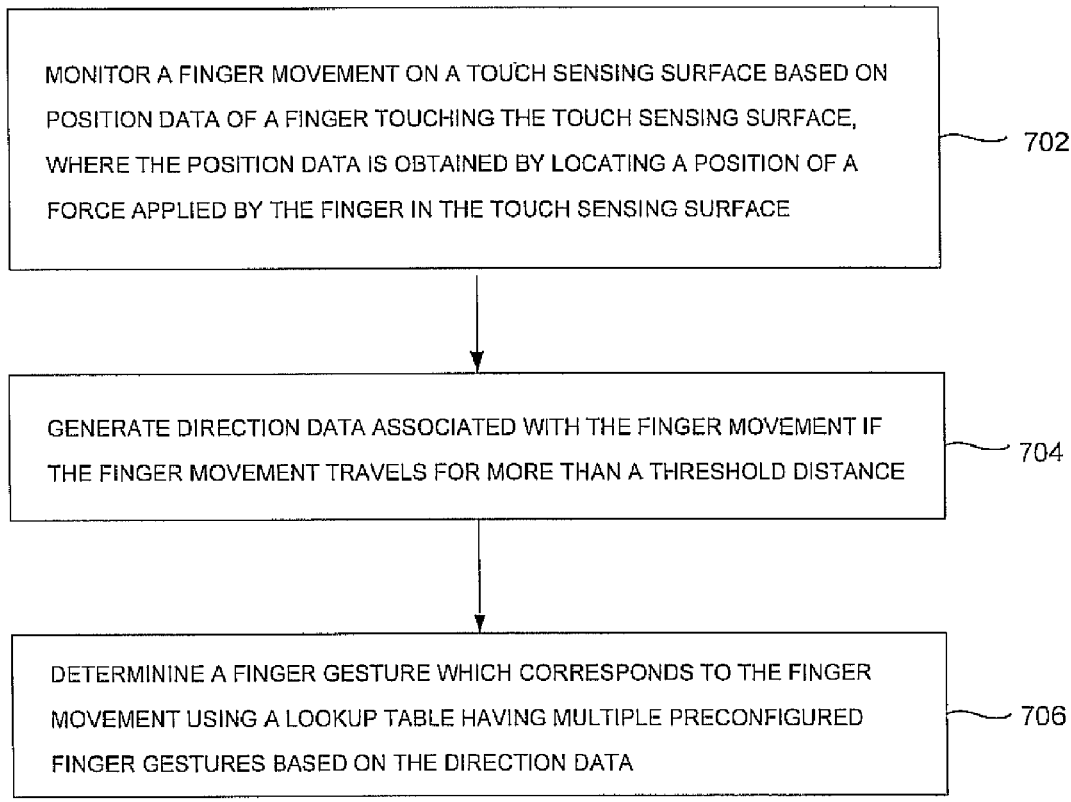
FIG. 7 illustrates a process flow chart of an exemplary method for identifying a finger gesture, according to one embodiment of the present invention.

FIG. 7 illustrates a process flow chart of an exemplary method for identifying a finger gesture, according to one embodiment of the present invention. In operation 702, a finger movement along a touch sensing surface is monitored based on position data of a finger touching the touch sensing surface, where the position data is obtained by locating a position of a force applied by the finger in a coordinate of the touch sensing surface. In one embodiment, the finger movement may be based on one or more linear finger movements.

In operation 704, direction data associated with the finger movement is generated if the finger movement travels for more than a threshold distance. In one embodiment, the direction data associated with the finger movement may be generated for each linear finger movement if a distance traveled by each linear finger movement is greater than a threshold distance. Additionally, the direction data may comprise an angle of each linear finger movement, where the angle may be identified as one of eight primary directions.

In operation 706, a finger gesture which corresponds to the finger movement is determined using a lookup table having multiple preconfigured finger gestures based on the direction data. In one embodiment, the finger gesture may comprise a single finger gesture.

It is appreciated that the methods disclosed in FIG. 7 may be implemented in a form of a machine-readable medium embodying a set of instructions that, when executed by a machine, cause the machine to perform any of the operations disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:

1. A method comprising:
    tracking position data of a conductive object on a touch sensing surface;
    determining direction data of the conductive object from the position data when the conductive object moves more than a threshold distance, wherein the direction data corresponds to a plurality of predetermined directions;
    storing the direction data as digital values when the conductive object moves more than the threshold distance;
    counting a number of times there is a change in direction by the conductive object;
    selecting from a plurality of preconfigured gestures using the stored digital values and the number of times there is the change in direction to determine a gesture corresponding to movement of the conductive object on the touch sensing surface.

2. The method of claim 1, wherein the storing the direction data comprises storing the digital values in an array.

3. The method of claim 1, further comprising, when the conductive object moves more than the threshold distance, determining whether there is the change in direction by the conductive object.

4. The method of claim 1, wherein the determining the direction data comprises:
    determining a plurality of linear movements of the conductive object;
    for each of the plurality of linear movements, determining a primary direction of the conductive object.

5. The method of claim 4, wherein the determining the primary direction comprises determining an angle of each of the plurality of linear movements with respect to a first axis.

6. The method of claim 1, wherein the plurality of predetermined directions are defined as a specified number of directions relative to a two-axis coordinate system of the touch sensing surface.

7. The method of claim 1, wherein the selecting comprises performing a lookup operation in a lookup table comprising the plurality of preconfigured gestures, and wherein the lookup table comprises, for each gesture, a number of direction changes involved in the gesture and corresponding directions taken by the gesture.

8. A non-transitory computer readable medium for recognizing a gesture on a touch sensing surface having instructions that, when executed by a computer, cause the computer to perform a method comprising:
    tracking position data of a conductive object on a touch sensing surface;
    determining direction data of the conductive object from the position data when the conductive object moves more than a threshold distance, wherein the direction data corresponds to a plurality of predetermined directions;
    storing the direction data as digital values when the conductive object moves more than the threshold distance;
    counting a number of times there is a change in direction by the conductive object;
    selecting from a plurality of preconfigured gestures using the stored digital values and the number of times there is the change in direction to determine a gesture corresponding to movement of the conductive object on the touch sensing surface.

9. The non-transitory computer readable medium of claim 8, wherein the storing the direction data comprises storing the digital values in an array.

10. The non-transitory computer readable medium of claim 8, wherein the method further comprises, when the conductive object moves more than the threshold distance, determining whether there is the change in direction by the conductive object.

11. The non-transitory computer readable medium of claim 8, wherein the determining the direction data comprises:
    determining a plurality of linear movements of the conductive object;
    for each of the plurality of linear movements, determining a primary direction of the conductive object.

12. The non-transitory computer readable medium of claim 11, wherein the determining the primary direction comprises determining an angle of each of the plurality of linear movements with respect to a first axis.

13. The non-transitory computer readable medium of claim 8, wherein the plurality of predetermined directions are defined as a specified number of directions relative to a two-axis coordinate system of the touch sensing surface.

14. The non-transitory computer readable medium of claim 8, wherein the selecting comprises performing a lookup operation in a lookup table comprising the plurality of preconfigured gestures, and wherein the lookup table comprises, for each gesture, a number of direction changes involved in the gesture and corresponding directions taken by the gesture.

15. A touch sensing device, comprising:
    a touch sensing surface for sensing movement of a conductive object along the touch sensing surface; and a processor coupled to the touch sensing surface, the processor configured to:
  monitor a conductive object movement on the touch sensing surface based on position data of the conductive object contacting the touch sensing surface;
  generate direction data associated with the conductive object movement if the conductive object movement travels for more than a threshold distance, wherein the direction data corresponds to a plurality of predetermined directions;
  count a number of times there is a change in direction by the conductive object; and
  determine a gesture that corresponds to the conductive object movement using a lookup table having a plurality of preconfigured gestures based on the direction data and the number of times there is the change in direction.

16. The touch sensing device of claim 15, wherein the touch sensing surface comprises one of a single layer touch sensing surface; a two layer touch sensing surface; and a multilayer touch sensing surface.

17. The touch sensing device of claim 15, wherein the touch sensing surface comprises one of: a touch screen; a touch pad; a track pad; and a touch panel.

18. The touch sensing device of claim 15, wherein the processor is implemented using a programmable device.

* * * * *